United States Patent [19]
Ojeda

[11] Patent Number: 6,120,901
[45] Date of Patent: Sep. 19, 2000

[54] UV PROTECTED SYNDIOTACTIC POLYSTYRENE OVERLAY FILMS

[75] Inventor: Jaime R. Ojeda, Woodbury, Minn.

[73] Assignee: 3M Innovative Properties Company, St. Paul, Minn.

[21] Appl. No.: 09/098,965

[22] Filed: Jun. 18, 1998

Related U.S. Application Data

[62] Division of application No. 08/761,912, Dec. 9, 1996, Pat. No. 5,981,076.

[51] Int. Cl.⁷ ..................................................... B32B 27/18
[52] U.S. Cl. ........................... 428/421; 428/203; 428/451; 428/516; 428/424.2; 428/447
[58] Field of Search ..................................... 428/203, 201, 428/447, 515, 516, 500, 520, 451, 424.2, 421

[56] References Cited

U.S. PATENT DOCUMENTS

| | | | |
|---|---|---|---|
| 3,745,010 | 7/1973 | Janssens et al. | 430/512 |
| 3,761,272 | 9/1973 | Mannens et al. | 430/15 |
| 3,928,930 | 12/1975 | Attwood | 40/145 R |
| 3,980,696 | 9/1976 | Anderson | 428/483 |
| 4,443,534 | 4/1984 | Kojima et al. | 430/512 |

(List continued on next page.)

FOREIGN PATENT DOCUMENTS

| | | |
|---|---|---|
| 2099104 | 12/1993 | Canada . |
| 0 282 294 | 9/1988 | European Pat. Off. . |
| 0570932A2 | 11/1993 | European Pat. Off. . |
| 57-45169 | 3/1982 | Japan . |
| 58-38269 | 3/1983 | Japan . |
| 8038269 | 3/1983 | Japan . |
| 07068937 | 3/1995 | Japan . |
| 07232412 | 9/1995 | Japan . |
| 08281823 | 10/1996 | Japan . |
| 2290745A | 1/1996 | United Kingdom . |
| PCT/US93/05938 | 1/1994 | WIPO . |

OTHER PUBLICATIONS

"Styrene Polymers" *Concise Enclyclopedia of Polymer Science and Engineering*, Joh Wiley & Sons, vol. 16, (1989), pp. 1–5.

"Weathering" *Concise Encyclopedia of Polymer Science and Engineering*, John Wiley & Sons, (1990) pp. 1307–1309.

(List continued on next page.)

*Primary Examiner*—Paul Thibodeau
*Assistant Examiner*—D Lawrence Tarazano
*Attorney, Agent, or Firm*—John A. Fortkort

[57] ABSTRACT

A UV weatherable film construction is provided which is capable of retaining its dimensional stability under extreme environmental temperatures and humidities. The base film polymer, syndiotactic polystyrene, has characteristically low moisture absorption, excellent thermal stability, and high transparency. When used in combination with a UV-blocking coating, the sPS film exhibits a degree of resistance to UV-induced discoloration and degradation that is substantially superior to unprotected sPS films or films based on sPS resins that are merely compounded with a UV absorber. The sPS cover films of the present invention are useful as overlay films in signing and other outdoor applications, are comparable to UV-absorber loaded acrylic films in UV blocking or resistance, and provide a cost competitive alternative to acrylic, polyester, and fluoropolymer overlay films.

22 Claims, 2 Drawing Sheets

U.S. PATENT DOCUMENTS

| | | | |
|---|---|---|---|
| 4,455,368 | 6/1984 | Kojima et al. | 430/507 |
| 4,528,311 | 7/1985 | Beard et al. | 524/91 |
| 4,576,870 | 3/1986 | Liebler et al. | 428/315 |
| 4,585,679 | 4/1986 | Karabedian | 428/35 |
| 4,612,358 | 9/1986 | Besecke et al. | 526/259 |
| 4,631,314 | 12/1986 | Tung et al. | 525/314 |
| 4,652,656 | 3/1987 | Besecke et al. | 548/261 |
| 4,764,564 | 8/1988 | Schmidt et al. | 525/328.2 |
| 4,785,063 | 11/1988 | Slongo et al. | 526/259 |
| 4,892,915 | 1/1990 | Slongo et al. | 526/259 |
| 4,927,891 | 5/1990 | Kamath et al. | 525/327.3 |
| 5,006,624 | 4/1991 | Schmidt et al. | 526/243 |
| 5,082,717 | 1/1992 | Yaguchi et al. | 428/207 |
| 5,127,158 | 7/1992 | Nakano | 29/849 |
| 5,145,950 | 9/1992 | Funaki et al. | 528/481 |
| 5,166,238 | 11/1992 | Nakano et al. | 524/120 |
| 5,188,930 | 2/1993 | Funaki et al. | 430/536 |
| 5,219,940 | 6/1993 | Nakano | 525/133 |
| 5,273,830 | 12/1993 | Yaguchi et al. | 428/523 |
| 5,281,453 | 1/1994 | Yamada et al. | 428/35.7 |
| 5,294,662 | 3/1994 | Moore et al. | 524/516 |
| 5,318,839 | 6/1994 | Arai et al. | 428/329 |
| 5,346,950 | 9/1994 | Negi et al. | 525/57 |
| 5,371,058 | 12/1994 | Wittig, Jr. et al. | 503/206 |
| 5,382,639 | 1/1995 | Moore et al. | 526/243 |
| 5,389,431 | 2/1995 | Yamasaki | 428/288 |
| 5,409,777 | 4/1995 | Kennedy et al. | 428/411.1 |
| 5,427,997 | 6/1995 | Oshima | 503/227 |
| 5,476,899 | 12/1995 | Funaki et al. | 524/577 |
| 5,496,919 | 3/1996 | Nakano | 528/481 |
| 5,503,935 | 4/1996 | Patel | 428/412 |
| 5,527,386 | 6/1996 | Statz | 106/481 |
| 5,574,089 | 11/1996 | Goga | 524/556 |
| 5,604,626 | 2/1997 | Teowee et al. | 359/265 |
| 5,605,547 | 2/1997 | Lake | 29/25.01 |
| 5,608,003 | 3/1997 | Zhu | 524/516 |
| 5,610,000 | 3/1997 | Vishwakarma et al. | 430/512 |
| 5,629,365 | 5/1997 | Razavi | 524/37 |
| 5,654,365 | 8/1997 | Havriliak, Jr. et al. | 525/98 |
| 5,729,379 | 3/1998 | Allemand et al. | 359/270 |
| 5,741,837 | 4/1998 | Wu et al. | 524/87 |
| 5,756,068 | 5/1998 | Jimbow | 424/1.81 |
| 5,914,073 | 6/1999 | Kobayashi et al. | 252/585 |

OTHER PUBLICATIONS

"Styrene Plastics", *Encyclopedia of Chemical Technology*, vol. 22 (1997), pp. 1015–1073.

H. Razavi et al., "Paradigm Shift in UV Protection Technology" (paper presented at the SPE Conference, Oct. 12, 1993).

R. Gachter, H. Muller, and P. Klemchuk (Editors), *Plastics Additives Handbook*, pp. 194–195 ($3^{rd}$ Ed., published by Hanser Publishers, New York) (1993).

Skogg and West, "Principles of Instrumental Analysis", Second Ed., pp. 137; 1980.

"Polymer Weathering", Sorbalite by Monsanto, Polymeric UV Blockers (Preliminary Product Information Bulletin) (1994).

UV PROTECTED SYNDIOTACTIC POLYSTYRENE OVERLAY FILMS

This is a division of application Ser. No. 08/761,912 filed Dec. 9, 1996 now Pat. No. 5,981,076.

FIELD OF THE INVENTION

The present invention relates generally to UV protected films, and in particular to a UV protected syndiotactic polystyrene film useful as a cover film in outdoor applications.

BACKGROUND OF THE INVENTION

Currently, the resins of choice for photovoltaic encapsulants, signing overlay films, and similar outdoor applications are polymethyl methacrylate (PMMA), impact-modified PMMA, PMMA blends, and polyethylene terephthalate (PET). While these films have many desirable mechanical properties, including a high impact resistance, they also have high coefficients of hygroscopic expansion (CHE) (see Table 1). Consequently, all of these films are prone to dimensional distortions in high temperature, high humidity environments. Furthermore, many of these films are prone to moisture induced hydrolysis reactions. See, for example, "Concise Encyclopedia of Polymer and Science Engineering", pp. 1307–09 (1990). Thus, while PMMA has a relatively high (about 105° C.) glass transition temperature ($T_g$) under normal conditions, its Tg is effectively lowered in high humidity environments due to water plasticization. PET has similar difficulties with moisture absorption that leads to suppression of an already lower $T_g$ (68° C.) and molecular weight degradation via hydrolysis.

TABLE 1

Moisture Absorption and CHE Data for sPS, PMMA, and PET

| Film | Moisture Absorption (%) | Coefficient of Hygroscopic Expansion (ppm/% RH) |
|---|---|---|
| sPS | 0.03 | 0.5 |
| PMMA | 1.5 | 15 |
| PET | 0.5 | 10 |

Many films currently used in outdoor applications are also subject to staining from both natural sources, such as dirt, and artificial sources, such as graffiti. To combat this, several water-based, cross-linkable, fluorochemical low surface energy coating systems have been made from polymeric surfactants and oxazoline polymer crosslinkers. These materials are described, for example, in U.S. Pat. Nos. 5,382,639, 5,294,662, 5,006,624, and 4,764,564.

A further problem encountered with the use of polymeric films in outdoor applications concerns their exposure to UV radiation. Polymeric films which are subjected to long-term exposure to ultraviolet (UV) radiation have a tendency to become brittle and yellowed over time due to the onset of photo-oxidation. This is so even if the polymer itself is transparent in the UV region of the spectrum, since UV radiation may be absorbed by metal catalysts and other impurities remaining from the manufacturing process. See, for example, R. Hirt et al., *SPE Trans*, Vol. 1, 1 (1961). Consequently, most polymeric films which are to be used in signing and other outdoor applications are stabilized against UV degradation by compounding the base resin with UV absorbing (UVA) additives and/or other compounds that act as excited state quenchers, hydroperoxide decomposers, or free radical scavengers. Hindered-amine light stabilizers (HALS) have been found to be particularly good radical scavengers. UVA additives act by absorbing radiation in the UV region of the spectrum. HALS, on the other hand, behave by quenching radicals generated within the polymer matrix during exposure to UV radiation. A review of the types of materials used to improve UV stability may be found in R. Gacliter, H. Muller, and P. Klemchuk (Editors), *Plastics Additives Handbook*, pp. 194–95 (3rd Ed., published by Hanser Publishers, New York).

In some instances, UV-sensitive substrates have also been protected with a UV-absorbing topcoat. Thus, PCT/US93/05938 discloses aqueous latices of UV-absorbing polymers that can be applied as topcoats on UV-sensitive substrates. Similarly, H. Razavi et al., "Paradigm Shift In UV Protection Technology" (paper presented at the SPE Conference, Oct. 12, 1993) describe a UV absorbing top coat wherein the UV absorber is covalently bonded to the backbone of a carrier polymer.

While work on UV-stabilizers has progressed, much work has also been done on the development of polymers having specific tacticities. Thus, recent developments in catalysis technology have enabled the synthesis of stereoisomers of polystyrene having a predominantly syndiotactic configuration. This material, referred to herein as syndiotactic polystyrene (sPS), has been used to produce various articles which exhibit good dimensional stability and/or heat or moisture resistance. Such references include U.S. Pat. No. 5,496,919 (Nakano), U.S. Pat. No. 5,188,930 (Funaki et al.), U.S. Pat. No. 5,476,899 (Funaki et al.), U.S. Pat. No. 5,389,431 (Yamasaki), U.S. Pat. No. 5,346,950 (Negi et al.), U.S. Pat. No. 5,318,839 (Arai et al.), U.S. Pat. No. 5,273,830 (Yaguchi et al.), U.S. Pat. No. 5,219,940 (Nakano), U.S. Pat. No. 5,166,238 (Nakano et al.), U.S. Pat. No. 5,145,950 (Funaki et al.), U.S. Pat. No. 5,127,158 (Nakano), and U.S. Pat. No. 5,082,717 (Yaguchi et al.).

The high dimensional stability of sPS films in high temperature/high humidity environments would make them desirable as overlay films for signing and other outdoor applications. However, sPS films are prone to UV-induced molecular weight breakdown and yellowing, phenomena which are often attributed to the presence of UV absorbing catalyst residues, peroxide groups in the polymer chain, and/or oxidation products formed during high temperature processing. Furthermore, as with other polystyrenes, sPS has inherent photochemical instabilities due to the large number of activated tertiary hydrogens. These hydrogens have a propensity to be photochemically extracted, thereby initiating free radical degradation pathways.

Some attempts have been made to improve the resistance of sPS to UV radiation. Thus, U.S. Pat. No. 5,496,919 (Nakano) discloses the preparation of articles based on sPS by compounding the sPS base resin with various additives such as antioxidants and UV absorbers. However, the use of UVAs and HALS in sPS films is found to only moderately improve their long-term outdoor weatherability. To date, the failure to produce sPS films that are stabilized against UV radiation has thwarted the development of commercial overlay films based on sPS for signing and other outdoor applications.

It is thus an object of the present invention to provide an sPS overlay film which has good dimensional stability, is resistant to UV degradation, and is suitable for use in signing and other outdoor applications. This and other objects are achieved by the present invention, as hereinafter described.

SUMMARY OF THE INVENTION

The present invention is a UV weatherable film construction capable of retaining its dimensional stability under extreme environmental temperatures and humidities. The base film polymer, syndiotactic polystyrene, has characteristically low moisture absorption, excellent thermal stability, and high transparency. When used in combination with a UV-blocking coating, the sPS film exhibits a degree of resistance to UV-induced discoloration and degradation that is substantially superior to unprotected sPS films or films based on sPS resins that are merely compounded with a UV absorber. The sPS cover films of the present invention are useful as overlay films in signing and other outdoor applications, are comparable to UV-absorber loaded acrylic films in UV blocking or resistance, and provide a cost competitive alternative to acrylic, polyester, and fluoropolymer overlay films.

In one embodiment of the invention, the sPS cover film contains a substrate comprising sPS which is provided on at least one side with a layer of PMMA. The PMMA is preferably bonded to the sPS substrate through an intermediate bonding layer comprising a copolymer, preferably a block copolymer, of styrene and a second monomer selected from the group consisting of esters of acrylic acid and the alkyl and aryl derivatives thereof The PMMA may be loaded with a UV-blocking material and/or a colorant. This embodiment is particularly advantageous for colored signing applications in that the dye can be placed in the PMMA layer. This avoids the color shifts sometimes observed when the dye is put in the sPS layer, thereby allowing signs to be produced which are identical in color to preexisting signs.

In another embodiment, the sPS substrate is provided with a coating comprising a copolymer of a UV-absorbing monomer and a fluoromonomer. The coating imparts a low surface energy to the film, making it easily cleanable and graffiti resistant.

DETAILED DESCRIPTION OF THE PREFERRED EMBODIMENT

Figure 1:
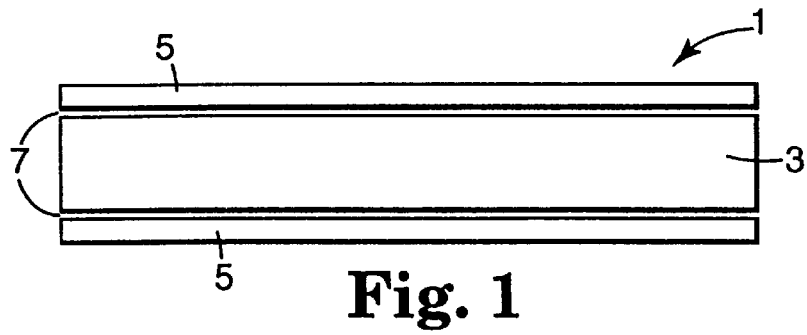
FIG. 1 is a schematic representation of a cover film construction in accordance with the present invention, comprising an sPS core layer with tie layer and PMMA skin/outside layers.

The present invention concerns a UV weatherable film construction capable of retaining its dimensional stability under extreme environmental temperatures and humidities. The base film polymer, syndiotactic polystyrene, has a high $T_g$, a characteristically low moisture absorption, and a nonpolar chemical structure which gives the film improved thermal/hydrophobic dimensional performance compared to PET and PMMA. Additionally, sPS is crystalline when compared to general purpose polystyrene (i.e., atactic polystyrene, or aPS), making it more resistant to thermal shrinkage and moisture absorption. In addition, the high transparency of sPS makes it suitable for use as a cover film in signing and other applications where high visibility is required. Also, sPS has better mechanical properties (e.g., a higher modulus and tensile strength) than atactic polystyrene.

In accordance with the present invention, an sPS substrate is provided with a coating of a UV-blocking material such that light from the ultraviolet region of the spectrum is absorbed by the UV-blocking layer, while light from the visible region of the spectrum (or a desired portion thereof) is efficiently transmitted. Without wishing to be bound by theory, it is believed that the UV-blocking layer serves as a protective screen for the underlying film by completely absorbing all solar UV radiation; by contrast, when the sPS resin is merely compounded with a UV absorber, the surface of the sPS film is still exposed to significant amounts of UV radiation, leading to significant degradation and discloration along the surface of the film.

Various grades of sPS may be used in the present invention, depending on the application to which the film is directed. For most applications, however, the sPS will have a molecular weight in the range of about 200,000 to about 450,000. In certain applications, the sPS may be grafted, copolymerized, or blended with various monomeric or polymeric species to impart desired properties to the material. For example, in some embodiments the sPS may be blended with varying amounts of isotactic or atactic polystyrene. The sPS may also be crosslinked to any desired degree, as where greater dimensional stability is required beyond that inherent in the film.

While the sPS used in the present invention will typically be derived from unsubstituted styrene monomer, varying amounts of styrene monomer containing alkyl, aryl, and other substituents may also be used. Thus, for example, the use of about 5 to about 10% of para-methylstyrene monomer is found to improve the clarity of the resulting film.

A UV-blocking coating may be imparted to the sPS substrate by any means as are known to the art, including gravure, air knife, curtain, slot, and other coating methods, or by coextrusion, lamination, chemical adhesion, immersion, and vapor or solvent deposition. In the case of Sorbalite™ and similar water-based latex UV-blockers, the coating is preferably applied by way of gravure or air knife coating methods. In some applications, the sPS resin itself may also be compounded with a UV-absorbing material.

Because sPS has a characteristically low surface energy, it will often be advantageous to prepare the surface of the substrate prior to applying the UV-blocking layer. When a water-based latex coating is to be applied to an sPS substrate, this may be accomplished through corona or flame treatment. Such a treatment improves the hydrophilicity of the substrate by generating reactive radicals along the surface of the film. Surfactants may also be advantageously used to reduce the surface tension of the coating below that of the sPS substrate, thereby allowing the coating to be evenly spread over the substrate.

While it will usually be desirable to apply to the sPS substrate a UV-absorbing coating or layer that is compatible with sPS, in some cases, it may be necessary or desirable to coat or coextrude the sPS substrate with a UV-absorbing layer that is incompatible with the substrate. In such a case, the UV-absorbing coating or layer may tend to delaminate from the substrate. This problem may be overcome in coextrusion applications through use of an intermediate bonding layer or tie layer comprising a material capable of bonding securely to both the UV-blocking layer and the substrate. Frequently, such a material will be a copolymer of styrene and a second monomer having good affinity for the UV-blocking layer. Thus, for example, if the UV-blocking layer comprises PMMA, the bonding layer may be a copolymer of styrene and a second monomer selected from the group consisting of acrylic acid, the esters of acrylic acid, and the alkyl and aryl derivatives of acrylic acid and its esters. In coating applications, the use of a primer or priming layer on the sPS substrate may be advantageous. One skilled in the art will appreciate that the particular primer or priming layer desirable in a particular application will depend on various factors specific to the application, such as the choice of UV-blocking material used.

Various UV-blocking materials may be used in the UV-blocking layer of the present invention, including cerium oxide, titanium oxide, and other particulate or colloidal UV absorbers as are known to the art, and depending on the use for which the coated film is intended.

Molecular or monomeric organic UV absorbers may also be used in the present invention. However, when organic UV-absorbers are used, the UV-blocking material is preferably a polymer or copolymer formed by polymerizing a monomeric species, or copolymerizing such a species with another monomer, oligomer, or polymer, to provide a higher molecular weight UV-absorbing material. Such materials are advantageous over their monomeric analogs in that they exhibit less of a tendency to bloom to the surface of the UV absorbing coating. Blooming typically results in discoloration or blotching of the film, and may also result in the ultimate removal of the UV absorbing material through normal surface abrasion.

Suitable UV-absorbing monomers for use in the present invention include homopolymers and copolymers of vinyl-functionalized monomers of benzotriazole or benzophenone, and mixtures of these materials with plasticizing agents or coalescing agents. One example of such a monomer is (2-(2'-)hydroxy-5-methacryloyloxyethyl-phenyl)-2H-benzotriazole), available commercially from Noramco Inc. as Norbloc™ 7966. These materials, and methods for making them, are well known in the art and are described, for example, in U.S. Pat. Nos. 4,927,891, 4,892,915, 4,785,063, 4,576,870, 4,528,311, 3,761,272, 3,745,010, 4,652,656, 4,612,358, 4,455,368, and 4,443,534, and in EPO 0,282,294, PCT/US93/05938 (Razavi), and Japanese Kokai 57-45169 and 58-38269.

Suitable monomers that may be copolymerized with the UV-absorbing monomer (assuming, of course, that the UV-absorbing monomer is suitably functionalized) include acrylic acid, its esters, and alkyl and aryl derivatives of acrylic acid and its esters, terephthalic acid, naphthalene dicarboxylic acid, styrene, urethanes, and similar monomers. Also suitable in some applications are fluoroaliphatic radical-containing, ethylenically unsaturated monomers, such as perfluoroalkyl acrylate esters, e.g., $CH_2=CHCOOCH_2CH_2N(Et)SO_2C_{8F17}$, or fluoroalkyl vinyl ethers, e.g., $CH_2=CHOCH_2C_7F_{15}$. The monomers used in the invention may contain one or more silyl moieties. The copolymers formed with UV-absorbing monomers may be block, alternating, random, or graft copolymers.

Various additives may be added to the sPS and/or to the UV blocking layer in accordance with the present invention. Such additives include crosslinking agents, antioxidants, processing aids, HALS, UV-absorbers, lubricating agents, dyes, pigments, and other coloring agents, fillers, particulates (including silica and other inorganic oxides), plasticizers, fibers and other reinforcing agents, optical brighteners, and various monomers.

In order to improve the abrasion resistance properties of the cover film, one or more layers of the final construction may be loaded with colloidal silica or a similar inorganic oxide capable of forming a stable dispersion with the polymeric components of the compositions. Such inorganic oxides, and methods of using them to impart an abrasion resistant coating, are described, for example, in U.S. Ser. No. 08/494,157.

In films which are required to have good anti-graffiti properties and good scratch resistance, the sPS substrate may be coated with a copolymer of a UV-absorbing monomer and a fluoroaliphatic radical-containing, ethylenically unsaturated monomer. The later monomer may be partially fluorinated or perfluorinated, but preferably has a terminal portion that is perfluorinated. Thus, for example, the fluoroaliphatic radical-containing, ethylenically unsaturated monomer may contain a $—CF_2CF_2CF_3$ terminal group.

In applications where imageability is important, the sPS substrate may be coated with an imageable UV absorbing coating. Such coatings may be made, for example, from various urethane, acrylic, oxazolone, and ozaxine resins. One specific example is Sorbalite™ OU (Outdoor Urethane), a water-based UV blocker coating available commercially from Monsanto Company, St. Louis, Mo. The latex in this coating consists primarily of a high molecular weight UVA copolymer. Other specific examples include crosslinkable oxazoline or oxazine based coatings. Such imageable coatings can be applied by conventional coating methods (e.g., gravure, air knife, curtain, etc.).

The imageable coatings used in the present invention are preferably highly crosslinked. Such highly crosslinked materials impart a number of benefits, including greater scratch resistance, solvent resistance, and gloss retention, but have sufficient adhesion with imaging agents (e.g., inks, toners, dyes, and pigments) to permit imaging. By contrast, many fluorochemical or fluoropolymer coatings have extremely low surface energies that provide good graffiti resistance, but which are not conducive to imaging.

Films may be made in accordance with the present invention by applying a polymer bound UV-absorber to at least one surface of the sPS base film. The resulting film is then analyzed in a spectrophotometer to determine its suitability for accelerated UV exposure and/or long-term outdoor weathering. Film constructions that completely absorb UV radiation (i.e., those having <0.5% transmittance at wavelengths of light between 290–350 nm) are considered to be sufficiently protected by the UV-blocker. Such film constructions, when subjected to UV weathering, are found to be far more effective at reducing UV-induced discoloration than conventionally protected overlay films, and are also far more effective in reducing deleterious UV effects on signing substrates. In fact, Sorbalite™ coated sPS films exposed in a xenon arc laboratory accelerated exposure device have demonstrated discoloration resistance (i.e., low b* tristimulus) and gloss retention equivalent to a PMMA cover films. Unprotected sPS films, however, as well as sPS films compounded with UVAs and/or HALS, become severely yellowed and fail to retain gloss, even at exposures less than 1000 hours.

The thickness of the UV-absorbing coating in films of the present invention may vary, depending on the level of protection required for the substrate, the physical properties required for the composite film, and the concentration of UV-absorbing comonomer. Typically, however, the UV-absorbing coating will be from about 2 to about $10\mu$ thick, and preferably about $5\mu$ thick.

In one embodiment of the present invention depicted in FIG. 1, a cover film 1 for signing applications is provided by coating an sPS substrate 3 with a PMMA coating 5 that is heavily loaded with a UV-absorbing material such as a UV-absorbing comonomer. The PMMA coating is adhered to one or both sides of the sPS substrate with a copolymer 7 (preferably a block copolymer) of styrene and a monomer selected from the group consisting of acrylic acid, its esters, and the alkyl and aryl derivatives of acrylic acid and its esters. Thus, for example, the copolymer may be a block copolymer of styrene and methylmethacrylate. The PMMA coating imparts excellent weatherability to the cover film, while the sPS substrate provides excellent dimensional stability. This embodiment also provides certain other advantages over other sPS cover films. In many signing applications, industry or government standards require that signing used for particular purposes have a specific background color. Typically, the required hue is achieved by compounding a coating resin with one or more approved dyes or pigments in a concentration that will give rise to the desired color. When sPS is compounded with certain dyes or pigments, however, the resulting color may differ from that observed when the same dye or pigment is compounded with another resin. For example, when sPS is compounded with blue dye disperse blue #198 (an anthroquinone dye), the color of the resulting film has a different hue (typically lighter or less intense) than that of PMMA films treated with the same dye. This can be particularly troublesome when it is desired to replace existing PMMA-covered signing with signing having an sPS cover film, since additional processing or compounding steps may be required to reproduce the desired color match in the sPS film. However, if the colorant is loaded into the PMMA layer of the above described embodiment, an identical color match may be obtained using dye formulations and concentrations already established for PMMA.

In another embodiment of the present invention, the sPS substrate is coated with a water-based composition comprising an aqueous solution, emulsion, or dispersion of (a) a water-soluble or water-dispersible polymer or oligomer having at least one anionic moiety which is capable of reacting with an oxazoline or oxazine moiety; (b) a water-soluble or water-dispersible polymer or oligomer having at least one oxazoline or oxazine moiety; and (c) a UV-blocking material. The UV-blocking material may be compounded with (a) and/or (b). Alternately, the UV-blocking material may be a monomer that is copolymerized with (a) and/or (b). Where scratch resistance is required, the composition may further contain an inorganic oxide, preferably colloidal silica. At least one of polymers or oligomers (a) and (b) has at least one fluoroaliphatic moiety, and either polymer or oligomer (a) or (b) (or both) can further contain at least one silyl moiety.

In an especially preferred embodiment, the sPS substrate is coated with a water-based composition which includes an aqueous solution, emulsion, or dispersion of (a) a water-soluble or water-dispersible polymer or oligomer having interpolymerized units derived from at least one fluoroaliphatic radical-containing acrylate, at least one carboxy-containing monomer, and at least one silyl moiety derived from a trialkoxysilylalkyl acrylate or methacrylate or trialkoxysilylalkyl mercaptan in which alkyl has from 1 to about 10 carbon atoms and alkoxy has from 1 to about 3 carbon atoms;

(b) a water-soluble or water-dispersible polymer or oligomer having at least one oxazoline or oxazine moiety;

(c) a UV absorber such as Norbloc™ 7966; and (d) colloidal silica having an average particle diameter of at least about 5 nanometers. Upon curing, the composition forms a crosslinked polymeric coating (e.g., containing at least one amide-ester crosslink moiety derived from the reaction of carboxyl groups with oxazoline or oxazine moieties) having colloidal silica integrated therein. Such a coating provides a low surface energy hard coat to impart abrasion resistance to the sPS substrate, and may also be used advantageously with various sPS composite structures (e.g., multilayer composites containing one or more layers of sPS with one or more layers of another material such as PMMA, or multilayer composites containing one or more layers of sPS and a photoimaging substrate).

The overlay films of the present invention can be applied to a wide variety of substrates to impart protection from the elements and from UV radiation, and also to provide resistance to solvents and corrosion. In general, the type of substrates that can be coated with the cover films of the present invention include rigid and flexible substrates such as plastics, glass, metal, and ceramics. Representative examples include optical films; lenses used in ophthalmic spectacles, sunglasses, optical instruments, illuminators, watch crystals, and the like; and signs and decorative surfaces such as wallpaper and vinyl flooring. The cover films of the present invention are also generally useful as a protective film in outdoor applications, as in signing applications or encapsulation of photovoltaic elements or electrical components, where protection from the elements and from UV radiation is desirable. Metal surfaces can be rendered resistant to corrosion by applying the cover films of the present invention thereto. Thus, for example, the brilliance of polish can be maintained on decorative metal strips and mirrors treated with the films of the present invention. Further, the films of the present invention can be colored by the addition of dyes and pigments and applied to surfaces as decorative strips or covers.

One particularly important application of the films of the present invention is as a protective overlay film in graphic arts and imaging applications. Thus, for example, the cover films of the present invention may be used advantageously to protect photographs, murals, paintings, drawings, graphic arts depictions on vehicles, passports, drivers' licenses, and other identification documents. In photographic applications in particular, it will frequently be desirable to coat the overlay film with an abrasion resistant coating as described herein to reduce damage to the substrate that might arise from frequent handling.

The following examples illustrate various features of the present invention, but are not intended to be limiting. With respect to these examples, it is to be noted that long term exposure (>500 hours) to a controlled 85° C./85% RH environment is a desirable practice for qualification of high performance cover films. Cover films that have undergone this type of weathering without incurring large shrinkages or expansions are considered reliable in the most severe weather conditions.

EXAMPLE 1

This example demonstrates the production of an sPS film suitable for use in the present invention.

A film of syndiotactic polystyrene (sPS) was produced on a conventional polyester film orientation line with a 4.5" (11.43 cm) extruder with equipped with a mixing screw. A 275,000 molecular weight sPS resin containing 4% para-methylstyrene (pMS) comonomer, available from Dow Chemical Company, Midland, Mich., was fed to the extruder. The extruder temperatures in zones 1–7 were 580° F. (304° C.), the gate was 580° F. (304° C.). The extrudate was filtered and pumped to a film die using a gear pump and necktube. The temperatures used were: filtration 550° F., gear pump 630° F., neck tube 610° F. and die 620° F. Out of the die, the sheet of polymer was cast onto a cast web on a chilled casting wheel equipped with electrostatic pinning. The casting wheel was maintained at 150° F.

The cast web was then stretched in the length direction (MD) on a series of idler rolls and heated with infrared radiant heating to a stretch temperature of 240° F. (116° C.). The ratio of length stretch was about 3.0:1. Then, the length stretched web was stretched in the width direction (TD) using a film tenter operated in the stretch zone at 240° F. (116° C.) and heat set at a temperature of 470° F. (243° C.). The width stretch ratio was about 3.3:1.

EXAMPLE 2

This example illustrates the application of a UV absorbing coating to an sPS film to impart UV resistance.

A Sorbalite™ OU water based latex solution, available commercially from Monsanto Corporation, was diluted to 15.6% solids. A 0.1% solution of Triton 1TX-100 surfactant, commercially available from Union Carbide Corporation, Danbury, Conn., was added to the solution to lower its surface tension to 40.5 dynes/cm. Next, an air knife coating set-up was used to apply the solution to the sPS film of Example 1 by way of an air corona treatment using an energy density of 1 J/cm$^2$. The air knife was set at a line speed of 70 fpm (21.3 m/min), an applicator roll speed of 50 rpm, and an air knife pressure of 1 psi (6.9 KPa). The sPS films were estimated to have a uniform 8 µm thick Sorbalite™ OU layer as determined by UV absorbence spectra of the coated film.

EXAMPLE 3

The following example illustrates the environmental stability of sPS coated substrates.

Figure 2:
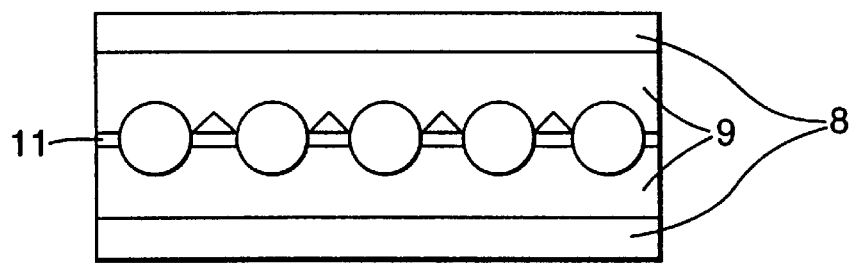
FIG. 2 is a schematic representation of a photovoltaic substrate encapsulated with a film made in accordance with the present invention.

Samples of the film 8 of Example 1 were coated with a 3M 92/8 IOA/ AA acrylate adhesive 9 using the techniques of Example 2 and were used to encapsulate identical samples of photovoltaic substrates 11 (solar cells) as shown in FIG. 2. Comparative samples were also made in which identical photovoltaic substrates were coated with PMMA, PET, and a PMMA-PVDF blend instead of sPS.

Figure 3:
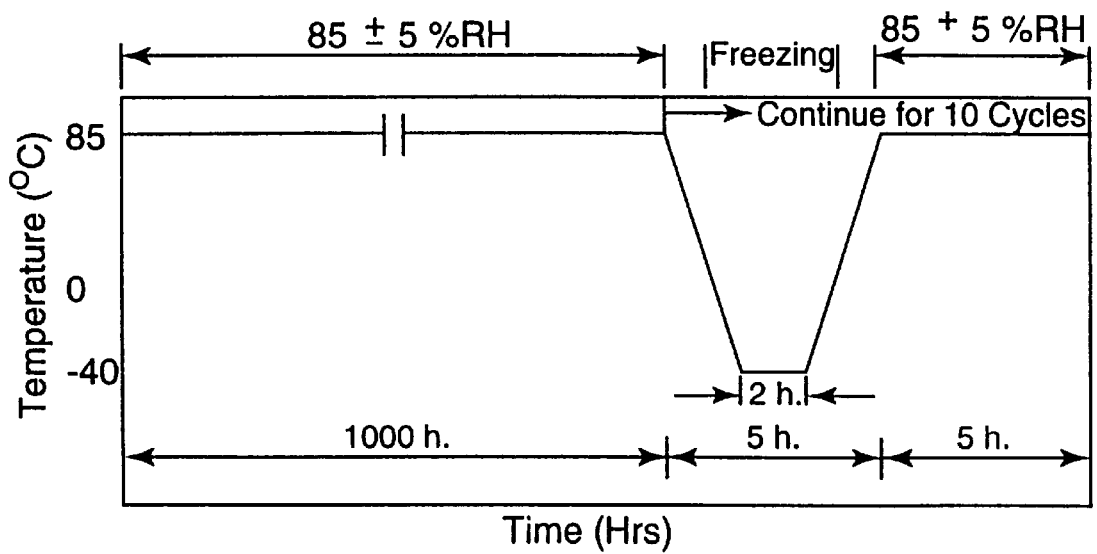
FIG. 3 is a humidity-freeze cycle test profile for a photovoltaic substrate encapsulated with a film made in accordance with the present invention.

The samples were exposed for over 1000 hours in an environmental chamber maintained at 85° C./85% relative humidity, followed by 10 heat-freeze cycles in which the temperature was varied between 85° C. and −40° C. (see FIG. 3). The samples were then evaluated for visible signs of dimensional distortion.

The sPS coated samples exhibited excellent dimensional stability. By contrast, the samples encapsulated with PMMA, PET, or PMMA-PVDF blend films failed the test due to high shrinkage, film delamination, or edge curl.

EXAMPLE 4

Figure 4:
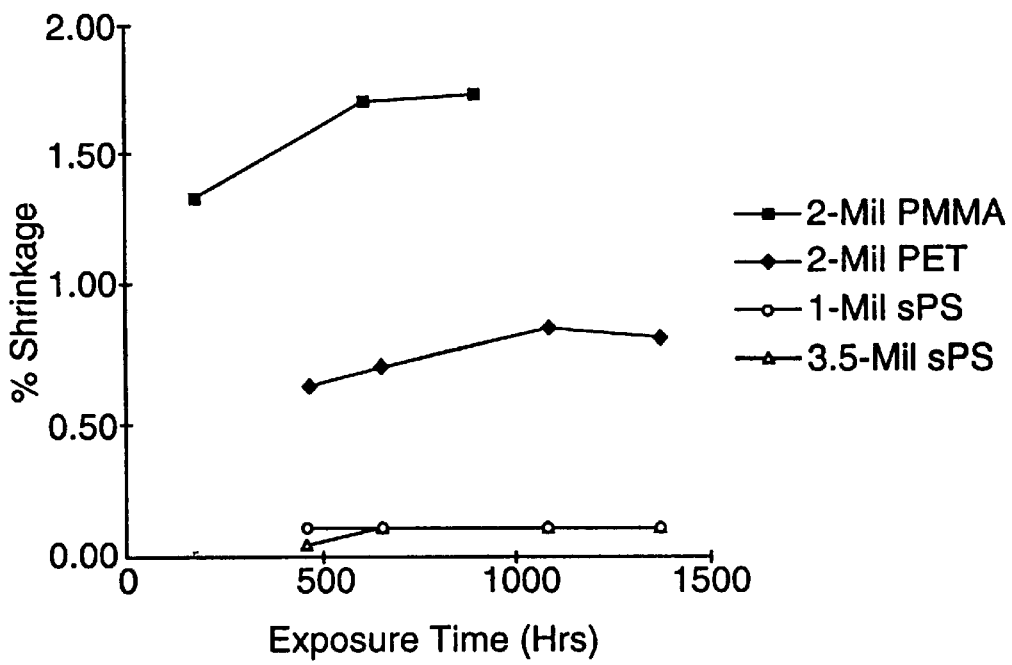
FIG. 4 is a graph of shrinkage as a function of time for various biaxially oriented films.

In order to quantify the dimensional stability of sPS films as compared to PMMA and PET cover films, another series of sPS films were produced as in Example 1 and were coated in accordance with the procedures of Example 2. The samples were again exposed in an environmental chamber which was maintained at 85° C./85% relative humidity, and their dimensional stability as a function of time was determined by frequent measurements of in-plane dimensional changes using an optical micrometer capable of measuring in-plane shrinkage or expansion to ±0.0001 inches (0.00254 cm). The results are shown in FIG. 4. In contrast to sPS, dramatic shrinkage was observed for biaxially oriented PMMA and PET films.

EXAMPLE 5

Samples of dimensionally stable, ultraviolet (UV) weatherable film constructions were made in accordance with Example 2. The thus prepared films were evaluated for dimensional stability at 85° C. and 85% relative humidity (RH) in an environmental chamber.

Dimensional changes were measured using an optical microweb capable of distinguishing in-plane changes of ±0.000 inches (0.00254 cm). Measurements were taken at intervals from 0 to 1500 hours.

Hygroscopic expansion was tested according to the procedures listed in "Hygroscopic Evaporation of Ampex and Sony D-1 Tape", report issued May 5, 1993 by National Media Lab, St. Paul, Min.

UV stability was determined by exposing the film samples in a xenon arc exposure device operated according to ASTM G 26-95, Type BH, Method A. Irradiance was controlled to produce 0.35 W/m2 at 340 nm. Color change was assessed by measuring CIE b* before and after exposure. Values were reported as Δb*-b* (CIE blue-yellow tristimulus).

Sheet distortion was a visual observation of the film samples after 4000 hours exposure to the 85° C./85 RH environment.

Notch tensile strength was determined according to the ASTM method previously described.

Break Elongation and Modulus were determined according to ASTM D882-91.

Processability was a subjective determination with "Fair" indicating some web breakage during film making and "Good" indicating substantially more uniformity in film processing.

Film shrinkage at 150° C. was determined according to ASTM D2838, as previously described.

The results of these measurements are set forth in Table 2.

EXAMPLE 6

A film was made as in Example 5, except that the film was biaxially oriented in a simultaneous, rather than sequential, manner. The equipment used for the orientation was a Kompf orienter, model number KOM.NR.8980, obtained from Bruchner Apparatebau GmbH, Erbach, Odenwald, Federal Republic of Germany.

The temperature at which the common orientation steps occurred was 113° C. and the stretch ratios were MD 3.3 and TD 4.1. The film was heat set at 240° C. Physical properties of the film are reported in Table 2.

Comparative Example C1

A film was made having a construction similar to that of the film of Example 5, except that impact modified polymethyl methacrylate was substituted for the sPS. Physical properties of the film are reported in Table 2.

Comparative Example C2

A film was made in a manner similar to Example 5, except that no coating was applied. Physical properties of the film are reported in Table 2.

Comparative Example C3

A film was made having a construction similar to that of the film of Example 5, except that a 40/60 blend of polyvinylidene fluoride (available from Solvay Polymers, Inc., Houston, Tex.) and polymethyl methacrylate resin (available from Atohaas NA, Inc.) was used instead of sPS.

EXAMPLE 7

A film was made in a manner similar to Example 6 except that the sPS resin included a 0.5% level of Ingonox 1425 antioxidant.

EXAMPLE 8

A film was made in a manner similar to Example 6, except that Blue Dye Diaresin Blue 4G, available from Mitsubishi Chemical Industries, Ltd., was added to the sPS at 0.9 wt %. Physical properties of the film are reported in Table 2.

TABLE 2

| Identification | Notch Tensile Strength (psi) | Break Elongation (%) | Modulus (kpsi) | Process-ability | 150° C. Shrink (%) |
|---|---|---|---|---|---|
| Example 5 (sPS seq) | — | 45 MD 32 TD | 500 MD 650 TD | FAIR | 0.6 MD 0.6 TD |
| Example 6 (sPS, simo) | 5800 | 55 MD 50 TD | 525 MD 585 TD | GOOD | 0.5 MD 0.5 TD |
| Comp. Example Cl | 3900 | 25 | 400 | FAIR | 8.3 MD 11.7 TD |
| Example 8 (sPS simo w/Blue Dye) | 4900 | 38 MD 38 TD | 490 MD 535 TD | GOOD | 0.7 MD 0.7 TD |

The results in Table 2 indicate films with balanced physical properties may be made using sPS and the stated process conditions.

Environmental exposure properties of some of the above films are shown in Table 3.

TABLE 3

| Identification | Dimen Stab 85° C./85 RH 4000 hrs % Shrink | 90° F. Δ23 RH → 92 RH Hygroscopic Expansion % | UV Stability Change in CIE Δb* ASTM G26, Type BH, Method A 1000 hours | UV Stability Change in CIE Δb* ASTM G26, Type BH, Method A 5000 hours | Sheet Distortion after 85/85 |
|---|---|---|---|---|---|
| Without Coating | | | | | |
| C2 | 0.03 MD 0.03 TD | 0.00 | 40.3 | Retired | Flat, minimal dist. |
| C1 | 5.0 MD 7.1 TD | 0.26 | -0.2 | 3.0 | Buckled, highly dist. |
| C3 With Coating | — | 0.13 | | | |
| Example 5 | | | -2.1 | 0.4 | |

The results in Table 3 indicate that UV-blocker protected sPS cover films provide maximum dimensional stability at increased temperatures and extreme relative humidity as well as excellent UV stability/weatherability when compared to conventional films.

A spectral transmission plot of some of the coated films described above is shown in FIG. 5.

Figure 5:
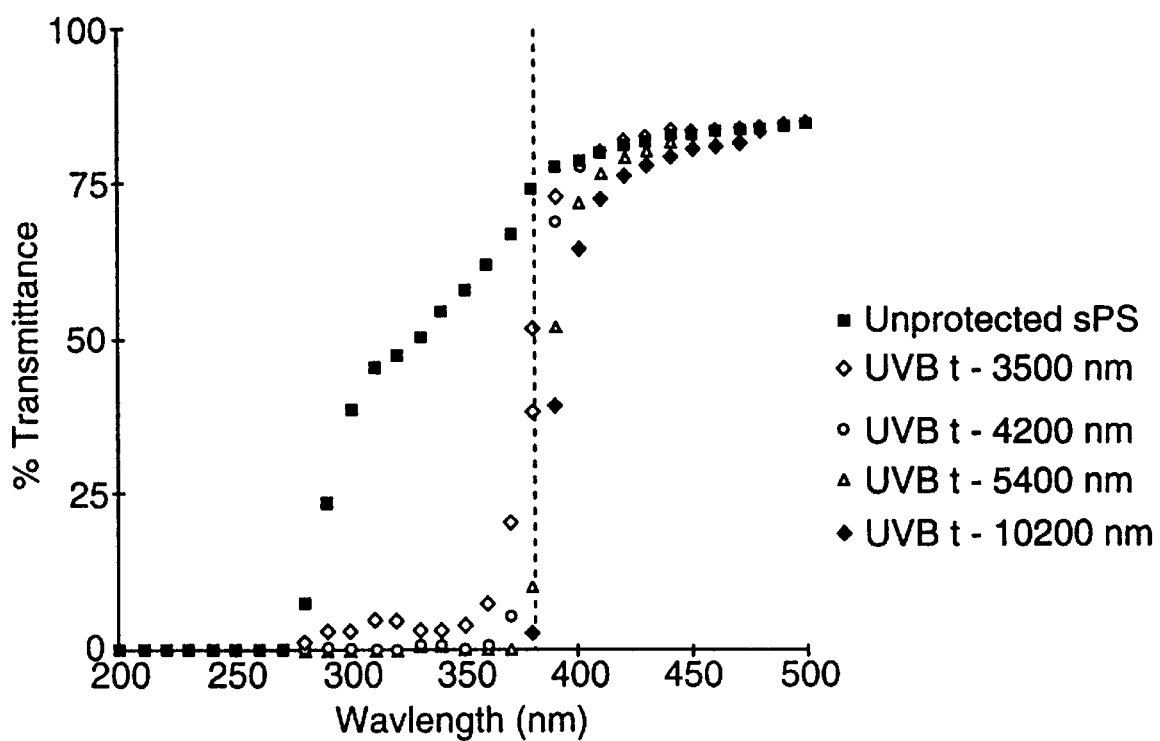
FIG. 5 is a graph of transmittance as a function of wavelength for sPS films coated with UV-blocking layers of varying thicknesses.

The results in FIG. 5 indicate a much reduced UV transmission (290<λ<370 nm) with the coated films of the invention when compared to uncoated films.

EXAMPLE 9

A film was made as in Example 1, except that the sPS resin contained 7% para-methylstyrene (pMS) and had a molecular weight of about 325,000. The film was coated in accordance with the procedures detailed in Example 2. The coated film was found to have improved clarity compared to coated films made in accordance with Example 1.

EXAMPLE 10

The following example illustrates the preparation of a crosslinkable UV-absorbing coating.

To a 1L 3-necked flask equipped with a mechanical stirrer, a cooling condenser, and a temperature control device was added methyl methacrylate (25 g), Norbloc™ 7966 (40 g), acrylic acid (25 g), mercaptopropanoic acid (5 g) ($HSCH_2CH_2COOH$), azobis(isobutylnitrile) (0.75 g, Vazo™ 64), N-methylpyrrolidinone (40 g), tetrahydrofuran (60 g), isopropyl alcohol (40 g), and A174 (5 g), a trimethoxysilane compound having the formula

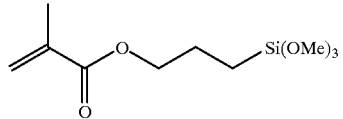

The solution was purged with nitrogen for about 3 min. and heated to initiate the polymerization. As the reaction became exothermic the temperature control was adjusted to 75° C. and heating continued at that temperature for about 12 hours. The cooling condenser was replaced by a distillation condenser, and isopropanol and THF were distilled from the reaction mixture. The reaction mixture was neutralized to a 30% solids content by addition of aqueous ammonia and water to give an almost clear, viscous solution having a piH of about 7.5.

A portion of the above solution (6.0 g solids, 23.6 mm COOH groups) was mixed with isopropenyloxazoline/ethyl acrylate methyl methacrylate (85/5/10 by weight, 3.0 g solids, 23 mmoles, available from Nippon Shakubai). This solution was then added to a colloidal silica dispersion mixture (9 g NalCo™ 2329, 1.0 g of water and three drops of concentrated $NH_3$), followed by 0.05% Triton™ X-100 and Surtynol™ 420 (based on solution weight) and 0.1% each, based on solution volume, of FC-129 and FC-170c (fluorochemical non-ionic surfactants available from 3M Corporation). Finally, about 0.5% (based on solids) of the following compound was added:

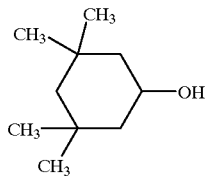

The resulting formulation was allowed to sit at room temperature for about 1–2 days before being coated onto a substrate.

EXAMPLE 11

The following example illustrates the application of a crosslinkable oxazoline coating to an sPS film. Coated films of this type are useful in applications where the sPS cover film needs to be imageable, but is required to impart solvent resistance to a substrate so that the substrate can be cleaned with cleaning solvents.

Using a #8 meyer bar coater, the coating of Example 10 was applied to a 3 mil sPS film. The coated film was cured in an oven for 2 minutes at 150° C. The resulting film was clear and comparable in appearance to samples of uncoated sPS. A UV spectrum of the film showed less than about 0.5% transmittance over most of the UV portion of the spectrum (290–350 nm).

EXAMPLE 12

The following example illustrates the preparation of a fluorochemical coating for use on the sPS cover films of the present invention.

A 5L 3-necked flask equipped with a mechanical stirrer, a cooling condenser, and a heating mantle was charged with FX-13 (220 g) having an average molecular weight of about 600, Norbloc™ 7966 (400 g), acrylic acid (240 g), A-174 (100 g), MPA (40 g), 2,2,6,6-tetramethyl-4-piperidinol (15 g), Vazo™ 64 (10 g; 1.0% based on solids), NMP (400 g), isopropyl alcohol (700 g), and tetrahydrofuran (400). The solution was then polymerized at 70° C. for 12 hours.

The initial exotherm of the solution was very noticeable. The solution went from an initial temperature of 60° C. to a maximum of 92° C., with the heating mantle being removed at about 75° C. After the initial exotherm, the solution stayed at 90° C. for about 20 minutes, and then gradually cooled to 70° C. where it remained for most of the polymerization. When the polymerization had concluded, the solution was clear and of moderate viscosity.

The tetrahydrofuran and isopropyl alcohol was stripped from the solution under reduced pressure at about 57° C., with about 830 g of solvent being recovered. The stripped polymer was then neutralized with a 30% aqueous ammonia solution to give a 30% solids solution. The neutralized solution was stirred at about 60° C. for 30 minutes and had a final pH of about 8.2.

The solution was then formulated with CX-Ws-300 crosslinker (436 g solids at 10.8% concentration with a total IPO functional group of 3.34 mole). The final formulation had 19.5% solids, a pH of 8.2, and was slightly translucent and moderately viscous.

The formulation was aged at 60° C. for about 1.5 hours. A clear coated film was obtained after curing at 120° C. for about 10 minutes. The coating had excellent dewetting properties, and a final solids content of 20% measured after heating at 105° C. for 2 hours.

EXAMPLE 13

The following example illustrates the application of a fluorochemical coating to an sPS film. Coated films of this type are useful in applications where the antigraffiti properties of the cover film are especially important, but imageability is not required.

Using a gravure type method, the composition of Example 12 was applied to a 3 mil sPS film. The coated film was cured in an oven for about 3 minutes at 150° C. The resulting film was clear and comparable in appearance to samples of uncoated sPS. A UV spectrum of the film showed less than about 0.5% transmittance over most of the UV portion of the spectrum (290–350 nm).

EXAMPLE 14

The "pen test" described in U.S. Pat. No. 5,294,662 was used to evaluate the antigraffiti properties of the film of example 13. In accordance with the test, a fine line is drawn across the surface of the coated film using a black Sharpie™ fine point permanent marker available from the Sanford Company, and a number value of 0 to 3 is assigned based on the appearance of the resulting line. The values are defined as follows: 3: totally unwettable, ink dewets to form a discontinuous line (best); 2: ink partially dewets to form a very thin continuous line; 1: some dewetting; 0: totally wettable, same as non-treated surface (worst). By way of illustration, a line written on a polytetrafluoroethylene surface dewets slightly and is assigned a 1.

When the film of Example 13 was subjected to the pen test, it scored a value of 3.

The preceding description is meant to convey an understanding of the present invention to one skilled in the art, and is not intended to be limiting. Modifications within the scope of the invention will be readily apparent to those skilled in the art. Therefore, the scope of the invention should be construed solely by reference to the appended claims.

What is claimed is:

1. A UV-weatherable film, comprising:
   a substrate comprising syndiotactic polystyrene; and
   a coating disposed on said substrate, said coating comprising a copolymer of a first monomer selected from the group consisting of vinyl-functionalized benzotriazoles and vinyl-functionalized benzophenones, and a second monomer selected from the group consisting of oxazolines, oxazines, urethanes, fluorochemical monomers, and silyl monomers.

2. The UV-weatherable film of claim 1, wherein said second monomer is a fluorochemical.

3. The UV-weatherable film of claim 1, wherein said second monomer is a urethane.

4. The UV-weatherable film of claim 1, wherein said second monomer is an oxazine.

5. The UV-weatherable film of claim 1, wherein said second monomer is an oxazoline.

6. The UV-weatherable film of claim 1, wherein said second monomer contains at least one trialkoxysilyl group.

7. The UV-weatherable film of claim 1, wherein said syndiotactic polystyrene is a copolymer of styrene and an alkyl-substituted styrene.

8. The UV-weatherable film of claim 1, wherein said syndiotactic polystyrene is a copolymer of styrene and para-methylstyrene.

9. The UV-weatherable film of claim 1, wherein said syndiotactic polystyrene comprises about 90 to about 95% styrene monomer and about 5 to about 10% para-methylstyrene monomer.

10. The UV-weatherable film of claim 1, wherein said first monomer is a vinyl-functionalized benzotriazole.

11. The UV-weatherable film of claim 1, wherein said first monomer is a vinyl-functionalized benzophenone.

12. The UV-weatherable film of claim 1, wherein said first monomer is a vinyl-functionalized benzotriazole.

13. The UV-weatherable film of claim 1, wherein said first monomer is a vinyl-functionalized benzophenone.

14. In combination with a traffic sign, a UV-weatherable film, comprising:

a substrate comprising syndiotactic polystyrene; and a coating disposed on said substrate, said coating comprising a copolymer of a first monomer and a second monomer, wherein said first monomer is selected from the group consisting of vinyl-functionalized benzotriazoles and vinyl-functionalized benzophenones, and wherein said second monomer is selected from the group consisting of oxazolines, oxazines, urethanes, fluorochemical monomers, and silyl monomers.

15. The UV-weatherable film of claim 14, wherein said second monomer is a fluorochemical.

16. The UV-weatherable film of claim 14, wherein said second monomer is a urethane.

17. The UV-weatherable film of claim 14, wherein said second monomer is an oxazine.

18. The UV-weatherable film of claim 14, wherein said second monomer is an oxazoline.

19. The UV-weatherable film of claim 14, wherein said second monomer contains at least one trialkoxysilyl group.

20. The UV-weatherable film of claim 14, wherein said syndiotactic polystyrene is a copolymer of styrene and an alkyl-substituted styrene.

21. The UV-weatherable film of claim 14, wherein said syndiotactic polystyrene is a copolymer of styrene and para-methylstyrene.

22. The UV-weatherable film of claim 14, wherein said syndiotactic polystyrene comprises about 90 to about 95% styrene monomer and about 5 to about 10% para-methylstyrene monomer.

* * * * *

UNITED STATES PATENT AND TRADEMARK OFFICE
CERTIFICATE OF CORRECTION

PATENT NO.   : 6,120,901
DATED        : September 19, 2000
INVENTOR(S)  : Jamie R. Ojeda It is certified that error appears in the above-identified patent and that said Letters Patent is hereby corrected as shown below:

Title page,
Under OTHER PUBLICATIONS, the publisher of the "Styrene Polymers" publication, "Joh Wiley" should read -- John Wiley --

Column 2,
Line 8, "Gacliter" should read -- Gachter --

Column 9,
Line 24, "1TX-100" should read -- TX-100 --

Column 10,
Line 21, "Min." should read -- MN. --

Signed and Sealed this

Nineteenth Day of March, 2002

Attest:

JAMES E. ROGAN
Attesting Officer — Director of the United States Patent and Trademark Office